(12) United States Patent
Isberg et al.

(10) Patent No.: US 9,337,699 B2
(45) Date of Patent: May 10, 2016

(54) MODULARIZED ELONGATION RING FOR AIR OUTLET IN SELF-VENTILATED TRACTION MOTOR

(75) Inventors: Peter Isberg, Västerås (SE); Per-Olof Lindberg, Västerås (SE)

(73) Assignee: ABB Technology Ltd, Zurich (CH)

( * ) Notice: Subject to any disclaimer, the term of this patent is extended or adjusted under 35 U.S.C. 154(b) by 0 days.

(21) Appl. No.: 13/051,761

(22) Filed: Mar. 18, 2011

(65) Prior Publication Data

US 2011/0169356 A1    Jul. 14, 2011

Related U.S. Application Data

(63) Continuation of application No. PCT/EP2009/060513, filed on Aug. 13, 2009.

(30) Foreign Application Priority Data

Sep. 19, 2008  (EP) .................................... 08164663

(51) Int. Cl.
    *H02K 9/00*   (2006.01)
    *H02K 5/20*   (2006.01)
    *H02K 1/32*   (2006.01)
    *H02K 9/06*   (2006.01)

(52) U.S. Cl.
    CPC ... *H02K 5/20* (2013.01); *H02K 9/06* (2013.01)

(58) Field of Classification Search
    CPC .................................. H02K 5/20; H02K 9/06
    USPC .................... 310/62, 63, 66, 89, 58
    See application file for complete search history.

(56) References Cited

U.S. PATENT DOCUMENTS

| | | | | |
|---|---|---|---|---|
| 3,177,731 A | * | 4/1965 | Peterson | B06B 1/16 384/321 |
| 3,341,113 A | * | 9/1967 | Sebok | F04D 17/164 310/62 |
| 3,643,119 A | * | 2/1972 | Lukens | H02K 9/06 310/60 R |
| 3,733,150 A | * | 5/1973 | Porter | F04D 25/082 415/98 |
| 4,527,960 A | * | 7/1985 | DeSisto | F04D 29/102 417/368 |

(Continued)

FOREIGN PATENT DOCUMENTS

| | | |
|---|---|---|
| CN | 2798399 Y | 7/2006 |
| CN | 1870398 A | 11/2006 |

(Continued)

OTHER PUBLICATIONS

International Search Report and Written Opinion of the International Searching Authority; PCT/EP2009/060513; Dec. 2, 2009; 8 pages.

(Continued)

*Primary Examiner* — Alex W Mok
(74) *Attorney, Agent, or Firm* — Whitmyer IP Group LLC

(57) ABSTRACT

An elongation ring adapted for use in a self-ventilated traction motor and for fixed placement between the non-driving end of the motor housing and a motor end shield. The ring has radial air outlet openings placed along its circumference and is adapted to enclose a fan wheel fixed on a motor driving shaft. A traction motor having such an elongation ring is also contemplated. The elongation ring provides a possibility to easily adapt a motor housing to different motor types such as a self-ventilated motor with the ring, or one with forced ventilation without the ring.

7 Claims, 1 Drawing Sheet

(56) References Cited

U.S. PATENT DOCUMENTS

| | | | | |
|---|---|---|---|---|
| 5,214,325 | A | * | 5/1993 | Matson .................... H02K 9/06 310/58 |
| 5,630,461 | A | * | 5/1997 | CoChimin ...................... 164/34 |
| 5,877,576 | A | * | 3/1999 | CoChimin ...................... 310/418 |
| 7,009,318 | B2 | * | 3/2006 | Iritani et al. ..................... 310/58 |
| 7,091,635 | B1 | | 8/2006 | Gilliland et al. |
| 2003/0143090 | A1 | | 7/2003 | Iritani et al. |
| 2005/0134130 | A1 | * | 6/2005 | Tsai et al. ....................... 310/89 |
| 2007/0210661 | A1 | * | 9/2007 | Schmidt et al. ................. 310/90 |
| 2007/0222311 | A1 | * | 9/2007 | Vasilescu ....................... 310/58 |
| 2007/0284954 | A1 | * | 12/2007 | Lin et al. ........................ 310/58 |

FOREIGN PATENT DOCUMENTS

| | | | |
|---|---|---|---|
| DE | 8915656 | U1 | 1/1991 |
| DE | 9408559 | U1 | 11/1994 |
| DE | 202004018937 | U1 | 2/2005 |
| GB | 1248957 | * | 10/1971 |
| JP | 2003222078 | A | 8/2003 |
| WO | 03066262 | A2 | 8/2003 |
| WO | 2005093930 | A1 | 10/2005 |

OTHER PUBLICATIONS

Chinese Office Action Application No. 200980136638.5 Issued: Apr. 1, 2012 10 pages.
Chinese Office Action Application No. 200980136638.5 Issued: Aug. 20, 2013 7 pages.
Chinese Office Action Translation Application No. 200980136638.5 Issued: Sep. 26, 2012 3 pages.
European Office Action Application No. 08 164 663.0 Issued: Oct. 31, 2012 5 pages.
European Search Report Application No. EP 08 16 4663 completed: Apr. 20, 2009; 4 pages.
International Preliminary Report on Patentability Application No. PCT/EP2009/060513 Issued: Mar. 22, 2011; 2 pages.
Japanese Office Action Translation Application No. 2011-527274 Issued: Aug. 20, 2013 3 pages.

* cited by examiner

MODULARIZED ELONGATION RING FOR AIR OUTLET IN SELF-VENTILATED TRACTION MOTOR

CROSS-REFERENCE TO RELATED APPLICATIONS

The present application is a continuation of pending International Patent Application PCT/EP2009/060513 filed on Aug. 13, 2009 which designates the United States and claims priority from European Patent Application No. 08164663.0 filed on Sep. 19, 2008, the content of which is incorporated herein by reference.

FIELD OF THE INVENTION

The invention relates to self ventilated traction motors and more particular to a means to provide ventilation without casting motor housings or end shields with air outlet openings or machining such in the housing or shield after the casting procedure.

BACKGROUND OF THE INVENTION

Motor housings and end shields for self ventilated traction motors are usually cast in one piece. This means that ventilation openings for the airflow through the stator and rotor inside the housing are cast at the same time or have to be machined in the cast housing or end shields afterwards. Furthermore a special longer housing or deeper end shields for self ventilated traction motors has to be cast taking into account the fan wheel width.

The present invention aims to provide a way to flexibly adapt a motor housing to different motor types and configurations and also enable standardisation of end shield design as well as the motor housing.

U.S. Pat. No. 7,091,635 discloses a flywheel arrangement comprising an elongation ring and a motor end shield, the flywheel arrangement being rotatable in relation to a motor housing.

SUMMARY OF THE INVENTION

According to one aspect of the present invention an elongation ring is adapted for use in a self-ventilated traction motor and for fixed placement between the non-driving end of the motor housing and a motor end shield. The ring has radial air outlet openings placed along its circumference and is adapted to enclose a fan wheel fixed on a motor driving shaft.

According to a further embodiment of the present invention the air outlet openings are selectively coverable by cover plates to regulate the air outlet from the motor and protect the fan and the interior of the motor from water splash from the railway track.

According to yet another embodiment of the present invention the elongation ring has a radially inwards protruding ring-formed lip arranged axially inside of the fan wheel, which lip overlaps radially the fan wheel.

According to a further aspect of the present invention a traction motor of self ventilated type comprises a motor housing, a first motor end shield and an elongation ring according to the present invention, fixedly arranged between the non-driving end of said motor housing and said first motor end shield, where the elongation ring is enclosing a fan wheel fixed on a motor driving shaft.

According to yet another embodiment of the present invention the housing has a square, pentagonal, hexagonal or higher shape or irregular shape.

According to a further embodiment of the invention the housing comprises cast boxes arranged on the outer surface of the housing providing areas for machining through holes for letting air, power cables and/or signal wires into the motor.

According to a further embodiment of the invention the cast boxes are placed on the upper portion of the housing.

BRIEF DESCRIPTION OF THE DRAWINGS

The features and the advantages of the present invention are further described, by way of example only, in the following description of preferred embodiments, with references to the following drawings of embodiments of the invention, in which.

DETAILED DESCRIPTION OF THE INVENTION

Figure 1:
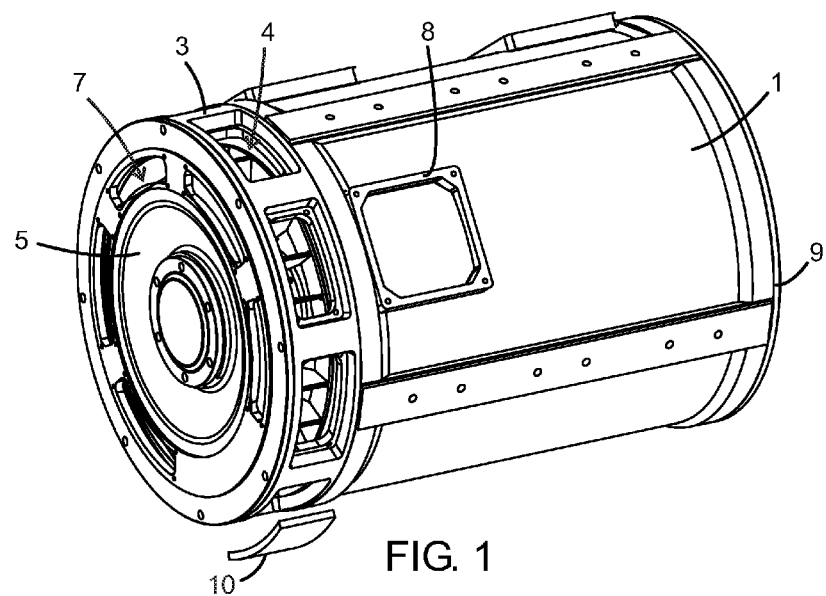
FIG. 1 shows a perspective view of a traction motor of self ventilated type equipped with an elongation ring according to the present invention.

An embodiment of the invention is described below referring initially to FIG. 1. A self-ventilated traction motor is shown which comprises a cylindrical motor housing 1. The motor housing 1 body is enveloping a rotor and a stator (not shown). Note that the invention also cover other than cylindrical housing geometries such the housing shape can be square, pentagon, hexagon or other shape, even irregular.

The rotor is arranged concentrically on an out-going rotor shaft (not shown) running through the housing 1 and to which a coupling connected to a gear box (not shown) may be attached, ultimately driving the driving wheels of the vehicle. At the opposite non-driving end of the motor the shaft is furnished with a fan 2 sucking air from the drive side of the motor through the motor interior and transporting it further to the surroundings through outlet openings 4. The outlet openings 4 are radial openings placed along a circumference of an elongation ring 3 that is arranged as an elongation fixed to the above-mentioned end of the housing 1 and is thus enclosing the fan wheel 2. On the opposite end of the elongation ring 3 a motor housing shield 5 is attached which also include axial outlet openings 7 used for other cooling arrangements. Thus the elongation ring 3 may be used with any housing length providing outlet openings 4 for the ventilation of the motor without making it necessary to cast the housing with such openings or further machining the housing to provide such openings.

Figure 2:
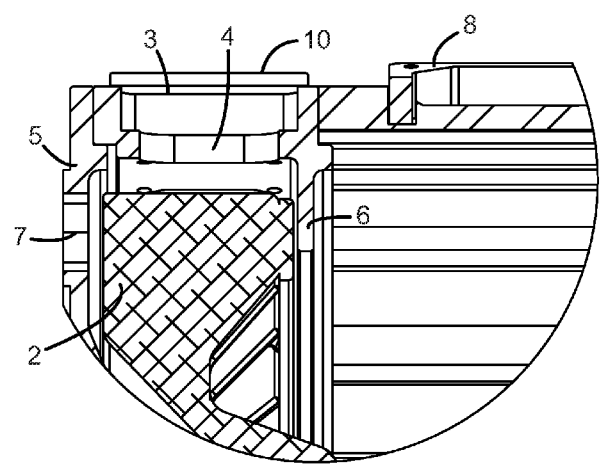
FIG. 2 shows a cut sectional view of the end of the traction motor in FIG. 1 with the elongation ring according to the present invention.

The elongation ring is further depicted in FIG. 2 showing a sectional view of a part of said elongation ring 3, the fan wheel 2 and the end shield 5. The air sucked by the fan wheel 2 is thus coming from inside the housing. To force the air stream to pass and cool the coil ends of the stator winding the elongation ring 3 has a radially inwards protruding ring-formed lip 6 arranged axially inside of the fan wheel 2. The lip 6 overlaps radially the fan wheel 2 and thus guides the air stream away from the outer rim of the elongation ring 3 to cool the coil ends and then, because of this overlap, through the fan wheel 2 rather than to let the air slip out past the outer diameter of the fan wheel 2 and through the outlet openings of the elongation ring 3 without passing said coil ends.

On the motor housing 1 envelope surface are also cast boxes 8 arranged. Their purpose is to provide possibilities to arrange air intakes or power cable or signal wire entries to the inner of the housing for connecting cables to the stator. By arranging several boxes 8 on the surface in different positions it will be possible to adapt the housing 1 to several different motor types machining through holes in the boxes 8 suited for the particular chosen condition. By arranging such boxes on the upper portion of the housing it is possible to avoid splashing of water and dirt from the rails.

The opposite driving end of the motor housing 1 is covered by a second end shield 9 fastened to the housing 1 and having a central through hole through which the driving motor shaft is arranged. This second end shield may also be equipped with air inlet holes which are selectably covered by cover plates in case the air intake flow needs to be varied, i.e. equal axial holes as the shield in FIG. 1 displays.

By using a elongation ring 3 in this manner to lengthen the motor space to house a fan, a standard motor housing may be used for both an open self ventilated motor (with an elongation ring and fan) and an open forced ventilated motor (without an elongation ring and fan). In a forced ventilated design the air is forced into the motor either via the housing or end shield by air duct channels by external fans or the air pressure caused by the train speed and therefore no fan is needed in the motor. In the latter case the end shield on the non-driving end of the motor is attached directly to the end of the motor housing. The motor housing length may also be scaleable with the same diameter to provide motors of different power capacity. In this case the same elongation ring 3 with fan may be used, which further displays the flexibility of this construction.

Adaptations that has to be made when using the elongation ring 3 is to have a longer shaft, longer bolts to fasten the end shield 5 to the housing 1 letting the bolts run through holes in the elongation ring 3.

The elongation ring together with the end shields provides many possibilities to adapt the streaming of the air flow due to the openings 4, 7. Some openings may be covered by cover plates 10 to direct the flow in a desired direction. Generally it is not particularly practical to have openings in the bottom of the end shield or elongation ring since this part of the motor is close to the railway track and water and dirt present on the track can be splashed or sucked into the motor interior.

To the person skilled in the art further modifications and variations of the described embodiments are possible.

What is claimed is:

1. A self-ventilated traction motor comprising:
    a motor housing;
    a motor end shield comprising axial air outlet openings;
    an elongation ring that is an individual machine part having radial air outlet openings along its circumference, the elongation ring fixedly arranged between a non-driving end of the motor housing and the motor end shield; and
    a fan wheel enclosed by the elongation ring, the fan wheel adapted to suck air from inside the motor housing such that the air flows out of the motor through the axial air outlet openings of the motor end shield and the radial air outlet openings of the elongation ring.

2. A self-ventilated traction motor according to claim 1, wherein the air outlet openings are selectively coverable by cover plates to regulate the air outlet from the motor and to protect the motor interior from water or dirt.

3. A self-ventilated traction motor according to claim 1, further comprising a radial inwards protruding ring-formed lip arranged axially inside of the fan wheel, the lip radially overlapping the fan wheel.

4. A self-ventilated traction motor according to claim 1, further comprising:
    a motor driving shaft;
    wherein the fan wheel is fixed on the motor driving shaft.

5. A self-ventilated traction motor according to claim 1, wherein the housing has a square, pentagonal, hexagonal or higher shape or irregular shape.

6. A self-ventilated traction motor according to claim 1, further comprising cast boxes arranged on the outer surface of the housing, the cast boxes providing areas for machining through holes for letting air, power cables and/or signal wires into the motor.

7. A self-ventilated traction motor according to claim 6, wherein the cast boxes are placed on an upper portion of the housing.

\* \* \* \* \*